US011521486B2

(12) United States Patent
McCall et al.

(10) Patent No.: US 11,521,486 B2
(45) Date of Patent: Dec. 6, 2022

(54) TRAFFIC VALIDATION SYSTEM AND METHOD

(71) Applicant: Eberle Design, Inc., Phoenix, AZ (US)

(72) Inventors: Timothy McCall, Phoenix, AZ (US); William Hilton Sowell, Mesa, AZ (US); Joseph Dudich, Phoenix, AZ (US)

(73) Assignee: Eberle Design Inc., Phoenix, AZ (US)

( * ) Notice: Subject to any disclaimer, the term of this patent is extended or adjusted under 35 U.S.C. 154(b) by 0 days.

(21) Appl. No.: 16/670,018

(22) Filed: Oct. 31, 2019

(65) Prior Publication Data

US 2020/0152054 A1 May 14, 2020

Related U.S. Application Data (60) Provisional application No. 62/758,485, filed on Nov. 9, 2018.

(51) Int. Cl.
*G08G 1/01* (2006.01)
*H04W 4/40* (2018.01)

(52) U.S. Cl.
CPC ......... *G08G 1/0125* (2013.01); *G08G 1/0112* (2013.01); *H04W 4/40* (2018.02)

(58) Field of Classification Search
CPC .... G08G 1/0125; G08G 1/0112; G08G 1/097; H04W 4/40; H04W 84/005; H04L 67/12
See application file for complete search history.

(56) References Cited

U.S. PATENT DOCUMENTS

| | | | |
|---|---|---|---|
| 8,742,946 B1 | 6/2014 | Worthy et al. | |
| 8,878,693 B2 * | 11/2014 | Nagura | G08G 1/096783 340/905 |
| 9,460,620 B2 | 10/2016 | Evans | |
| 2009/0048750 A1 | 2/2009 | Breed | |
| 2010/0325720 A1 | 12/2010 | Etchegoyen | |
| 2011/0095908 A1 | 4/2011 | Nadeem et al. | |
| 2013/0131980 A1 | 5/2013 | Ginsberg | |
| 2013/0194111 A1 * | 8/2013 | Potter, Sr. | G08G 1/042 340/933 |
| 2013/0200223 A1 | 8/2013 | Alexander et al. | |
| 2013/0337855 A1 | 12/2013 | Alexander et al. | |
| 2014/0349601 A1 | 11/2014 | Alexander et al. | |
| 2014/0358321 A1 | 12/2014 | Ibrahim | |
| 2014/0358322 A1 | 12/2014 | Ibrahim | |
| 2014/0358324 A1 | 12/2014 | Sagar et al. | |
| 2014/0358414 A1 | 12/2014 | Ibrahim et al. | |
| 2014/0358416 A1 | 12/2014 | Ibrahim | |
| 2016/0036558 A1 | 2/2016 | Ibrahim et al. | |
| 2016/0049079 A1 | 2/2016 | Ibrahim et al. | |
| 2016/0150451 A1 | 5/2016 | Barreto de Miranda Sargento et al. | |
| 2016/0156881 A1 | 6/2016 | Guan et al. | |

(Continued)

FOREIGN PATENT DOCUMENTS

EP 1830332 A2 9/2007

*Primary Examiner* — Hoi C Lau
(74) *Attorney, Agent, or Firm* — Jeffrey D. Moy; Weiss & Moy, PC (57) ABSTRACT

In accordance with an embodiment, a method for processing information associated with vehicular traffic includes monitoring two signals that include information associated with vehicular traffic. A comparison signal is generated by comparing the two signals. The two signals may be wireless signals, or one of the two signals may be a hardwired signal.

13 Claims, 7 Drawing Sheets

(56) References Cited

U.S. PATENT DOCUMENTS

| | | |
|---|---|---|
| 2016/0203717 A1 | 7/2016 | Ginsberg et al. |
| 2016/0351048 A1 | 12/2016 | Thompson et al. |
| 2018/0031671 A1 | 2/2018 | Alexander et al. |
| 2018/0045832 A1 | 2/2018 | Ibrahim et al. |
| 2018/0122227 A1 | 5/2018 | Mubarek et al. |
| 2018/0136008 A1 | 5/2018 | Engel et al. |
| 2018/0150086 A1 | 5/2018 | Nobukawa et al. |
| 2018/0257660 A1 | 9/2018 | Ibrahim et al. |
| 2018/0286232 A1* | 10/2018 | Shau .................. G08G 1/09623 |
| 2019/0135316 A1* | 5/2019 | Hilleary .................. B61L 29/30 |
| 2020/0280827 A1* | 9/2020 | Fechtel .................. H04W 4/46 |

* cited by examiner

TRAFFIC VALIDATION SYSTEM AND METHOD

The present application is a nonprovisional application of Provisional application No. 62/758,485 filed on Nov. 9, 2018, titled "TRAFFIC VALIDATION SYSTEM AND METHOD", which is hereby incorporated by reference in its entirety, and priority thereto for common subject matter is hereby claimed.

The present invention relates, in general, to traffic monitoring systems and methods for processing traffic information.

A signal monitor is a device used in traffic control assemblies to detect and respond to conflicting or otherwise improper signals. Such improper signals may arise, for example, due to field signal conflicts, a malfunctioning controller, faulty load switches, cabinet mis-wiring, improper supply voltages, or the like. When one or more certain critical failures occur, the signal monitor instructs (or causes other components to instruct) the signal lights to enter an emergency "flash" mode, in which the traffic lights on all sides of the intersection generally enter a flashing red state or an amber state. A flasher is a device in the traffic control assembly that delivers power to the selected signal light when operating in a flashing mode. Flash transfer relays are used to switch the source of the traffic signal power from load switches to the flasher.

It is often the case that certain other events external or internal to the traffic control cabinet occur that should be addressed. Such events include, for example, damage to the controller cabinet, problems with the cabinet power supplies, data communications issues, and relatively non-critical signal light conditions (such as faulty "DON'T WALK" signals, minimum green time violations, etc.). Some prior art signal monitors include additional logic outputs that provide more detailed status information to the controller, but such information is only provided in cases where a critical fault has occurred, and the intersection is already in a flash mode.

In addition, vehicle detectors have been used to generate information specifying the presence or absence of a vehicle at a particular location. This location may be referred to as a detection zone. These types of detectors have been used at, for example, intersections to supply information used by an associated traffic control unit to control the operation of the traffic signal heads and to supply control information used in conjunction with automatic entrance and exit gates in parking lots, garages, and buildings. One type of vehicle detector uses period shift measurement to determine the presence or absence of a vehicle in or adjacent the inductive loop mounted on or in a roadway.

Accordingly, it would be advantageous to have improved signal monitor systems and methods that may collect data regarding traffic such as, for example, traffic volume or traffic issues and use this data to improve travel. It would be of further advantage for the signal monitor system and method to be cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the word approximately, about, or substantially means that a value of an element has a parameter that is expected to be very close to a stated value or position. However, as is well known in the art there are always minor variances that prevent the values or positions from being exactly as stated.

Terms of enumeration such as "first," "second," "third," and the like may be used for distinguishing between similar elements and not necessarily for describing a particular spatial or chronological order. These terms, so used, are interchangeable under appropriate circumstances. The embodiments of the invention described herein are, for example, capable of use in sequences other than those illustrated or otherwise described herein. Unless expressly stated otherwise, "connected," if used herein, means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

The terms "comprise," "include," "have" and any variations thereof are used synonymously to denote non-exclusive inclusion. The terms "left," "right," "in," "out," "front," "back," "up," "down," and other such directional terms are used to describe relative positions, not necessarily absolute positions in space. The term "exemplary" is used in the sense of "example," rather than "ideal."

DETAILED DESCRIPTION

The following detailed description is merely exemplary in nature and is not intended to limit the range of possible embodiments and applications. Furthermore, there is no intention to be bound by any theory presented in the preceding background or the following detailed description.

For simplicity and clarity of illustration, the drawing figures depict the general topology, structure and/or manner of construction of the various embodiments. Descriptions and details of well-known features and techniques may be omitted to avoid unnecessarily obscuring other features. For example, conventional techniques and components related to traffic control devices are not described in detail herein. Elements in the drawing figures are not necessarily drawn to scale: the dimensions of some features may be exaggerated relative to other elements to assist understanding of the example embodiments.

Figure 1:
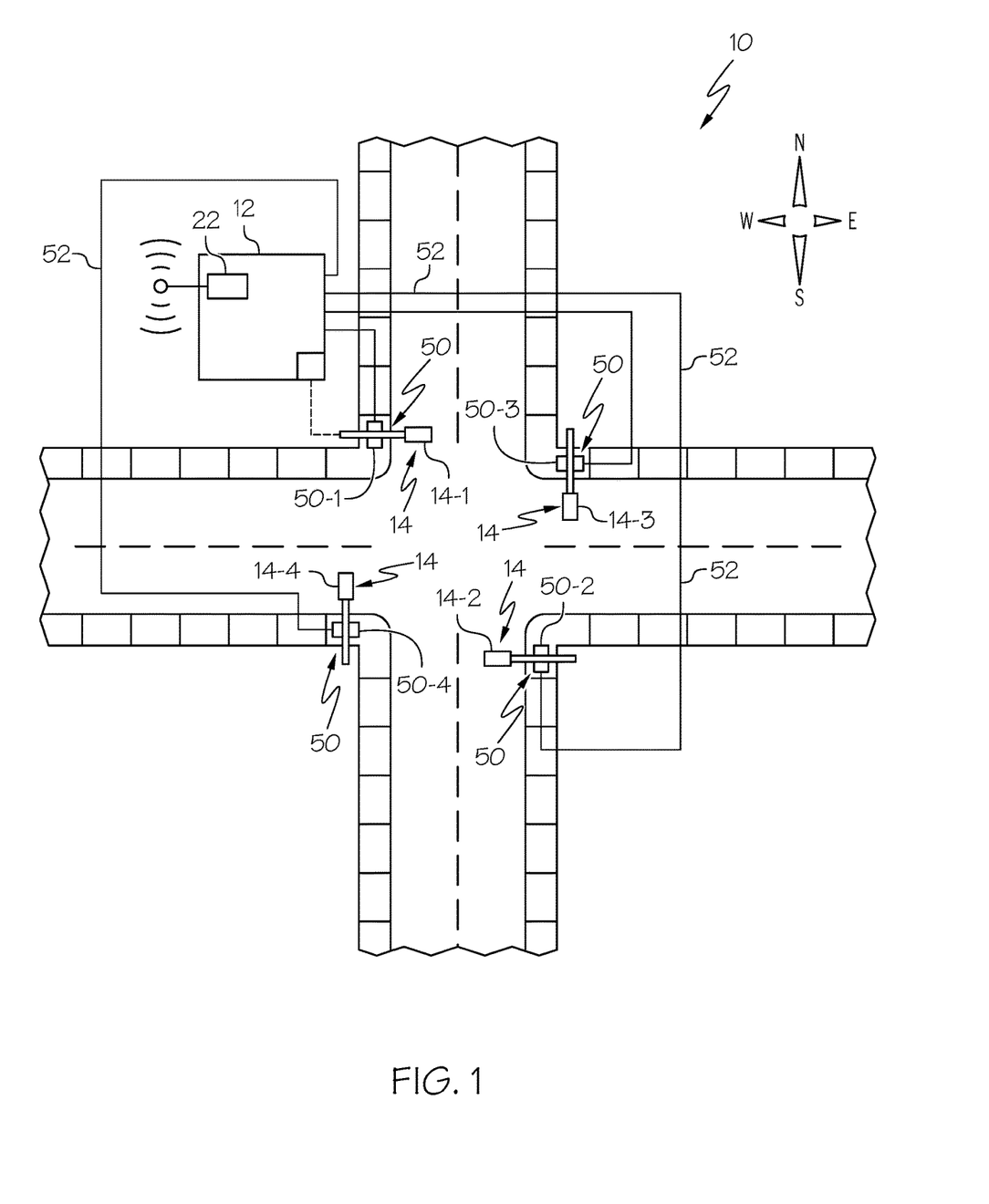
FIG. 1 is a diagram of a roadway intersection that includes a traffic monitoring system in accordance with an embodiment of the present invention.

FIG. 1 is a top view of a four-way intersection 10 controlled by a traffic control system 20 (shown in FIG. 2) that is within a controller cabinet 12. Controller cabinet 12 may be referred to as a traffic control cabinet. In the example shown in FIG. 1, traffic control system 20 within controller cabinet 12 controls four signal heads 14. To distinguish individual signal heads 14, the signal head at the north location of intersection 10 is identified by reference character 14-1, the signal head at the south location of intersection 10 is identified by reference character 14-2, the signal head at the east location of intersection 10 is identified by reference character 14-3, and the signal head at the west location of intersection 10 is identified by reference character 14-4. By way of example, signal heads 14-1 and 14-2 may control traffic flow in a north-south direction, including traffic turning into the east-west direction, and signal heads 14-3 and 14-4 may control traffic flow in an east-west direction, including traffic turning into the north-south direction. Cabinet 12 houses a traffic control system, e.g., traffic control system 20 of FIG. 2, configured for controlling traffic. Traffic control system 20 may also serve as a traffic monitoring system.

Figure 2:
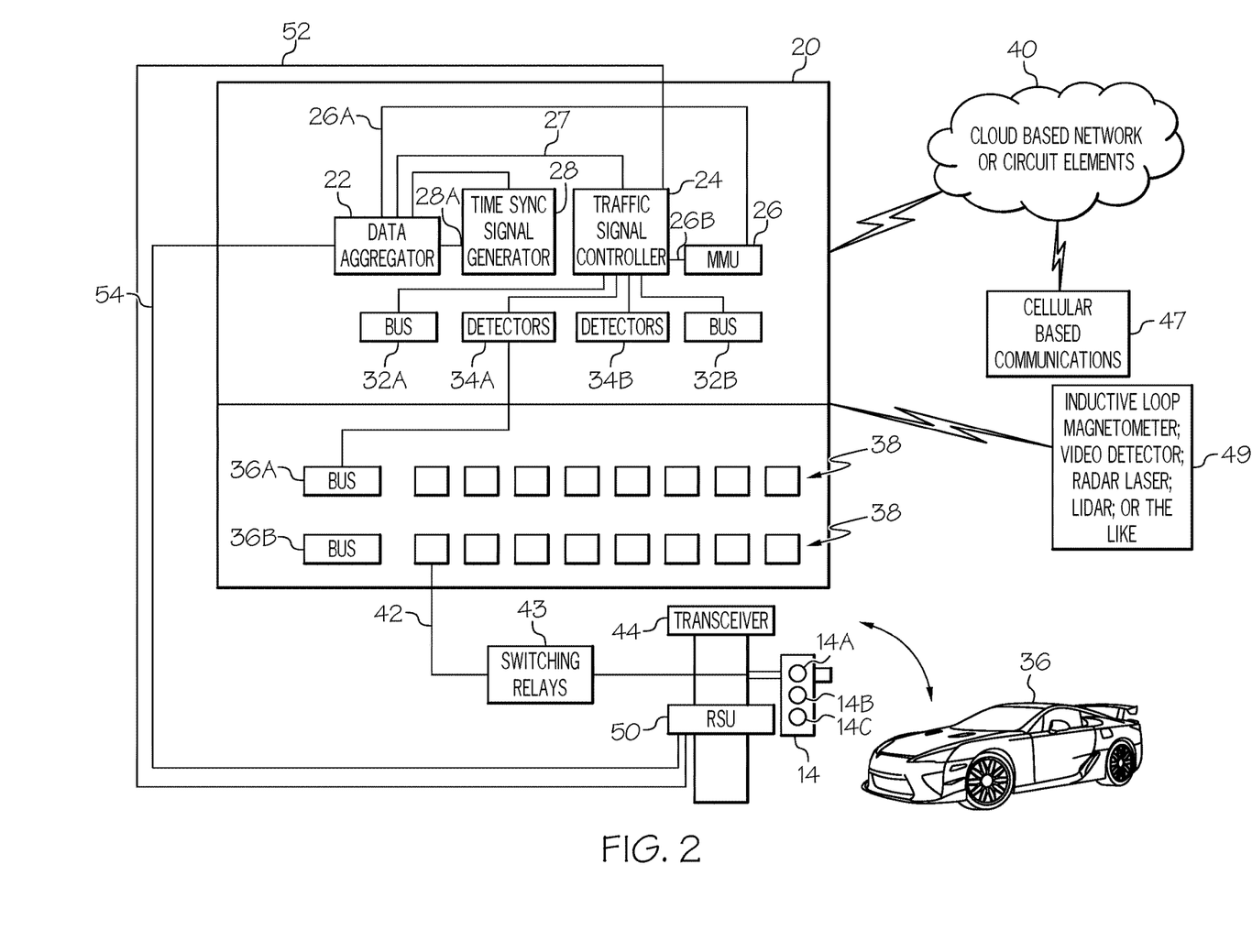
FIG. 2 is a block diagram of a traffic monitoring system in accordance with an embodiment of the present invention.

Referring to FIGS. 1 and 2, an example of a traffic control system 20 that may be within controller cabinet 12 is shown. Controller cabinet 12 is configured to support and protect traffic control system 20. What is shown in FIG. 2 is traffic control system 20 that includes, for example, a data aggregator 22, a traffic signal controller 24, a Malfunction Management Unit (MMU) 26, and a time sync signal generator 28. Traffic signal controller 24 may be referred to as a traffic signal generator and is connected to data aggregator 27 through an electrical interconnect 27. Malfunction management unit 26 is connected to data aggregator 22 by an electrical interconnect 26A and to traffic signal controller 24 by an electrical interconnect 26B. Time sync signal generator 28 is connected to data aggregator 22 by an electrical interconnect 28A. Traffic control system 20 further includes internal bus interface units 32A and 32B, detectors 34A and 34B, back panel bus interface units 36A and 36B and back panel load switches 38. Bus interface unit 36A is connected to detectors 34A and bus interface units 32A and 32B and detectors 34A and 34B are connected to traffic signal controller 24.

Components in controller cabinet 12 such as, for example, data aggregator 22 may be connected to a cloud-based network of circuit elements 40 such as processors, logic circuits, memory elements, etc. It should be noted that a cloud-based network of circuit elements may be comprised of an internet service based data storage and analysis system and may include a cloud-based server 40.

For the sake of completeness, FIG. 2 further illustrates that controller cabinet 12 may be connected to a traffic signal head such as, for example, signal head 14, via wiring 42 and switches 43 or via a Dedicated Short Range Communications (DSRC) radio transceiver 44 via the Ethernet and switches 43. Switches 43 may be referred to as switching relays or relays and may include solid state relays or electromechanical relays. Transceiver 44 is capable of transmitting signals to a traffic signal head and cloud-based network of circuit elements 40 and receiving signals from cloud-based network of circuit elements 40. Alternatively, controller cabinet 12 may be connected to a traffic signal head, such as, for example, signal head 14 and to cloud-based network of circuit elements 40 through a cellular based communications system 47 with options of 3G, 4G, 5G, GSM, GPRS, or the like. It should be noted that 3G refers to the third generation of cellular based communications systems, 4G refers to the fourth generation of cellular based communications systems, 5G refers to the fifth generation of cellular based communications systems, GSM refers to a Global System for Mobile Communications, and GPRS refers to a General Packet Radio Service.

Traffic signal head 14 may include lamps 14A, 14B, and 14C, where lamp 14A emits light in the red spectrum, lamp 14B emits light in the yellow spectrum, and lamp 14C emits light in the green spectrum.

In addition, a DSRC radio transmitter in a vehicle 36 may transmit to or receive information from data aggregator 22 via a DSRC radio transmitter or the cellular based communications system 47.

Data aggregator 22 transmits and receives real time intersection status and may pass signals such as, for example, Bluetooth signals, cellular based signals, Wireless Fidelity (WiFi) signals, or the like to a cloud-based server through, for example, a cellular modem. Data aggregator 22 is suitable for mounting in traffic control cabinet 12 and may include antenna ports for a Global Positioning System (GPS), Wireless Fidelity (WiFi), and Cellular (Cell) modems; Ethernet input/output ports; input/output ports suitable for use with a Synchronous Data Link Control (SDLC) communications protocol or an Electronic Industries Alliance (EIA) 232 communication protocol; a plurality of auxiliary input/output ports, and a power indicator signal. In addition, data aggregator 22 can receive signals from one or more of an inductive loop, a magnetometer, a video detector, a radar system, laser system, LiDAR (light detection and ranging) system, or the like as illustrated by reference character 49.

In addition, road side units (RSU's) 50 are mounted to the support structures to which signal heads 14 are mounted. To distinguish RSU's 50, the RSU at the north location of intersection 10 is identified by reference character 50-1, the RSU at the south location of intersection 10 is identified by reference character 50-2, the RSU at the east location of intersection 10 is identified by reference character 50-3, and the RSU at the west location of intersection 10 is identified by reference character 50-4. It should be noted that the traffic control system housed in intersection cabinet 12 may communicate with signal heads 14-1, 14-2, 14-3, and 14-4 via metal cables, fiber optic cables, via wireless communications, or the like. Likewise, the traffic control system housed in intersection cabinet 12 may communicate with RSU's 50-1, 50-2, 50-3, and 50-4. The number of signal heads and RSU's connected to cabinet 12 is not limited to four. There may be one, two, three, four, or more signal heads and RSU's connected to intersection cabinet 12.

In accordance with an embodiment, RSU's 50 are connected to traffic signal control system 20 within intersection cabinet 12 in a hardwired electrical interconnection configuration. Thus, RSU's 50 are connected to the traffic signal control circuit by electrical connections 52 such as copper wires, aluminum wires, or the like. Briefly referring to FIG. 2, an RSU 50 is shown as being connected to data aggregator 22 of traffic control system 20 by an electrical interconnect 54 and to traffic signal controller 24 by another electrical interconnect 52. Thus, RSU 50 is shown as being hardwired to traffic control system 20. By way of example, electrical interconnects 52 are copper wires.

In accordance with another embodiment, RSU's 50 are connected to traffic signal control system 20 within intersection cabinet 12 in an optical interconnection configuration. RSU's 50 are connected to the traffic signal control circuit by electrical connections where the electrical connections are optical fibers. Thus, RSU's 50 are hardwired to intersection cabinet 12 by optical fibers.

Figure 3:
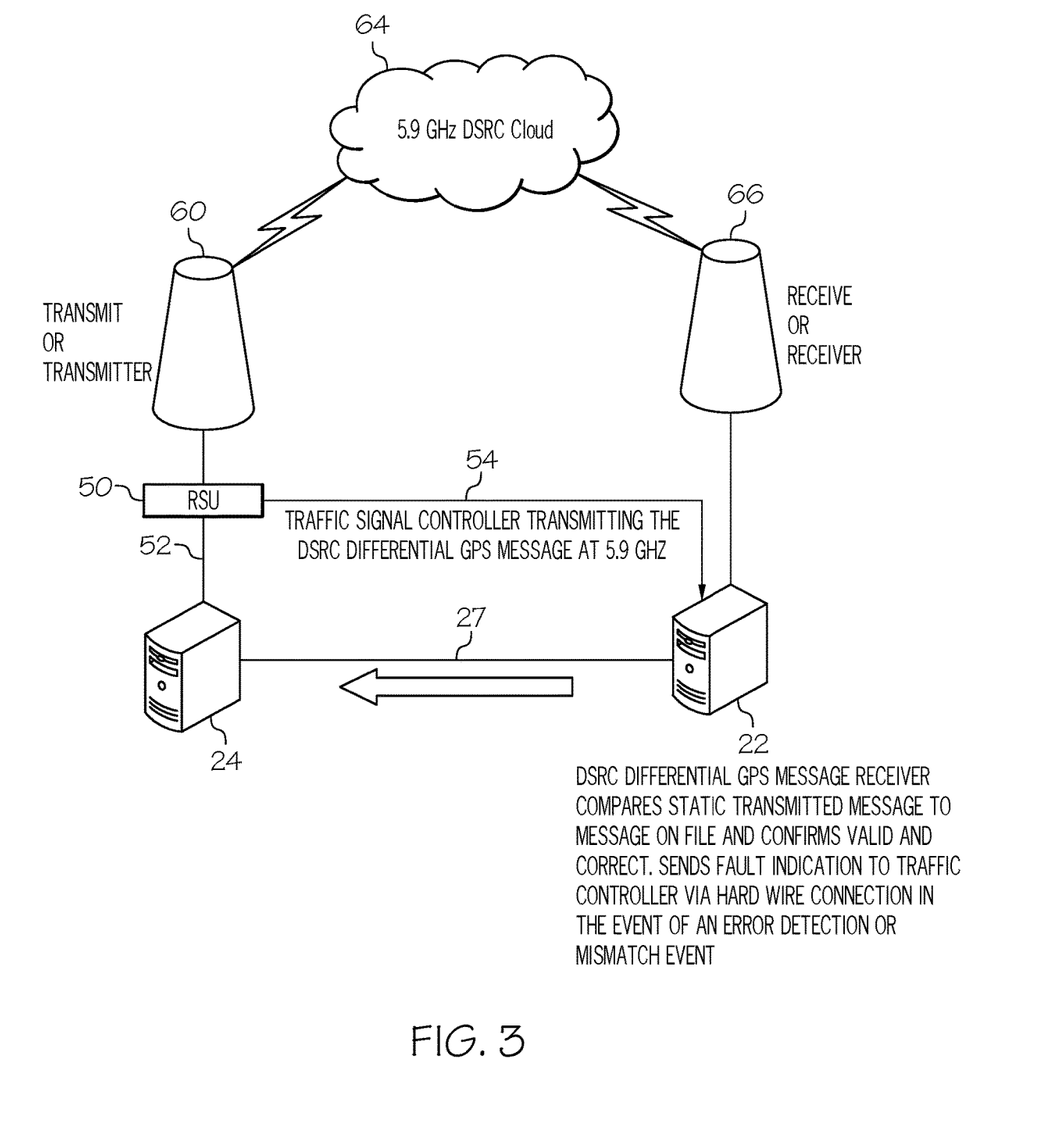
FIG. 3 is a diagram of a traffic control system in accordance with another embodiment of the present invention.

Referring now to FIG. 3, a high level diagram of a traffic control system such as, for example, traffic control system 20 is shown. What is shown in FIG. 3 is a traffic controller, such as, for example, traffic signal controller 24 shown in FIG. 2 coupled to a data aggregator such as, for example, data aggregator 22 shown in FIG. 2. In this example, traffic signal controller 24 is hardwired to data aggregator 22 by an electrical interconnect 27 such as, for example, a copper wire, an aluminum wire, an optical fiber, or the like. Traffic signal controller 24 is coupled to a road side unit (RSU) such as for example, RSU 50 shown in FIGS. 1 and 2. In accordance with an embodiment, traffic signal controller 24 is hardwired to RSU 50 through and electrical interconnect 52 and to data aggregator 22 through an electrical interconnect 54. Thus, RSU 50 is hardwired to data aggregator 22 through a metal interconnect, an optical interconnect, or the like.

RSU 50 has an antenna 60 configured for transmitting a signal through the cloud 64 to a receiving antenna 66 that is connected to data aggregator 22. In accordance with another embodiment antenna 60 is a portion of a transmitter and antenna 66 is a portion of a receiver. It should be noted that the cloud may include a server system configured to communicate with a central control facility, automobiles, buses, drones, other traffic signal controllers, other data aggregators, etc.

In operation in accordance with an embodiment, traffic signal controller 24 transmits a dedicated short range communication (DRSC) global position system (GPS) signal to RSU 50, which in response, transmits a signal to the cloud 64, which transmits a signal to receiver 66, which receiver 66 transmits the signal to data aggregator 22. RSU 50 also transmits the signal to aggregator 22 in a hardwired feedback configuration through electrical interconnect 54. Data aggregator 22 compares the hardwired feedback signal with the wireless signal transmitted from RSU 50 to the cloud. If there is a mismatch between the hardwired signal received by data aggregator 22 and the wireless signal received by data aggregator 22, data aggregator 22 generates a comparison signal indicating the mismatch or error. The comparison signal may serve as a fault indicator signal or an error signal or it may cause the traffic signal controller 24 to generate the fault indicator signal or the error signal. The fault indicator signal is transmitted to traffic signal controller 24 to indicate that an error detection or event mismatch has occurred.

In accordance with this embodiment, the traffic signal controller 24 transmits a signal to the cloud 64 at 5.9 GigaHertz (GHz) indicating the intersection should be placed in flash mode, where all the traffic signals indicate a flashing red signal so ensure the safety of the intersection.

Thus, data aggregator 22 serves as a DSRC differential GPS message receiver that compares a static transmitted message to a message on file and confirms whether the signal is valid and correct. Data aggregator 22 sends a fault indication signal to traffic controller 24 via a hard wire connection in the event of an error detection or mismatch event so that traffic controller 24 can issue an appropriate control signal.

Figure 4:
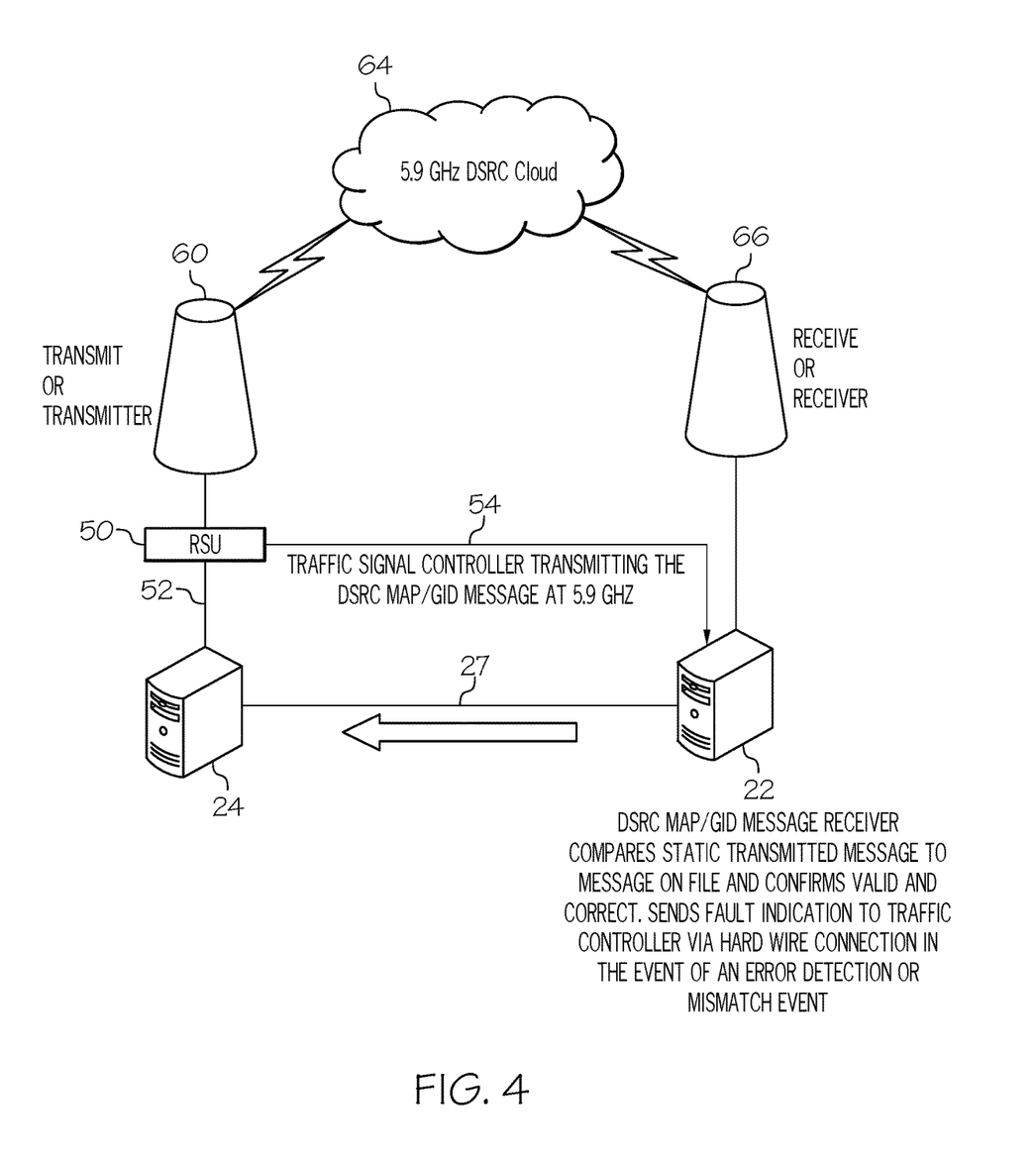
FIG. 4 is a diagram of a traffic control system in accordance with another embodiment of the present invention.

FIG. 4 is a high level diagram of a traffic control system such as, for example, traffic control system 20. What is shown in FIG. 4 is a traffic controller, such as, for example, traffic signal controller 24 shown in FIG. 2 coupled to a data aggregator such as, for example, data aggregator 22 shown in FIG. 2. In this example, traffic signal controller 24 is hardwired to data aggregator 22 by an electrical interconnect 27. Electrical interconnect 27 can be, for example, a copper wire, an aluminum wire, an optical fiber, or the like. Traffic signal controller 24 is coupled to a road side unit (RSU) such as for example, RSU 50 shown in FIGS. 1 and 2. In accordance with an embodiment, traffic signal controller 24 is hardwired to RSU 50 through an electrical interconnect 52. In addition, RSU 50 is electrically connected to, for example, data aggregator 22 through an electrical interconnect 54. Thus, RSU 50 is hardwired to data aggregator 22 through a metal interconnect, an optical interconnect, or the like.

RSU 50 has an antenna 60 configured for transmitting a signal through the cloud 64 to a receiving antenna 66 that is connected to data aggregator 22. It should be noted that the cloud may include a server system configured to communicate with a central control facility, automobiles, buses, drones, other traffic signal controllers, other data aggregators, etc.

In operation in accordance with an embodiment, traffic signal controller 24 transmits a dedicated short range communication (DRSC) MAP/GID signal to RSU 50, which in response, transmits a signal to the cloud 64 and in a hardwired feedback configuration to data aggregator 22. Data aggregator 22 compares the hardwired feedback signal with the wireless signal transmitted from RSU 50 to the cloud, which is then received by data aggregator 22 via receiver antenna 66 to generate a comparison signal. If there is a mismatch between the hardwired signal received by data aggregator 22 and the wireless signal received by data aggregator 22, data aggregator 22 generates a comparison signal indicating the mismatch. The comparison signal may serve as a fault indicator signal or an error signal or it may cause the traffic signal controller 24 to generate the fault indicator signal or the error signal. The fault indicator signal is transmitted to traffic signal controller 24 to indicate that an error detection or event mismatch has occurred.

In accordance with this embodiment, the traffic signal controller 24 a signal to the cloud 64 at 5.9 GigaHertz (GHz) indicating the intersection should be placed in flash mode, where all the traffic signals indicate a flashing red signal so ensure the safety of the intersection.

It should be noted that the frequency at which traffic signal controller 24 transmits signals is not a limitation. For example, it can transmit at 5.8 GHz or some other desired frequency.

In accordance with this embodiment, data aggregator 22 serves as a DSRC MAP/GID message receiver that compares a static transmitted message to a message on file and confirms whether the signal is valid and correct. Data aggregator 22 sends a fault indication signal to traffic controller 24 via a hard wire connection in the event of an error detection or mismatch event so that traffic controller 24 can issue an appropriate control signal.

Figure 5:
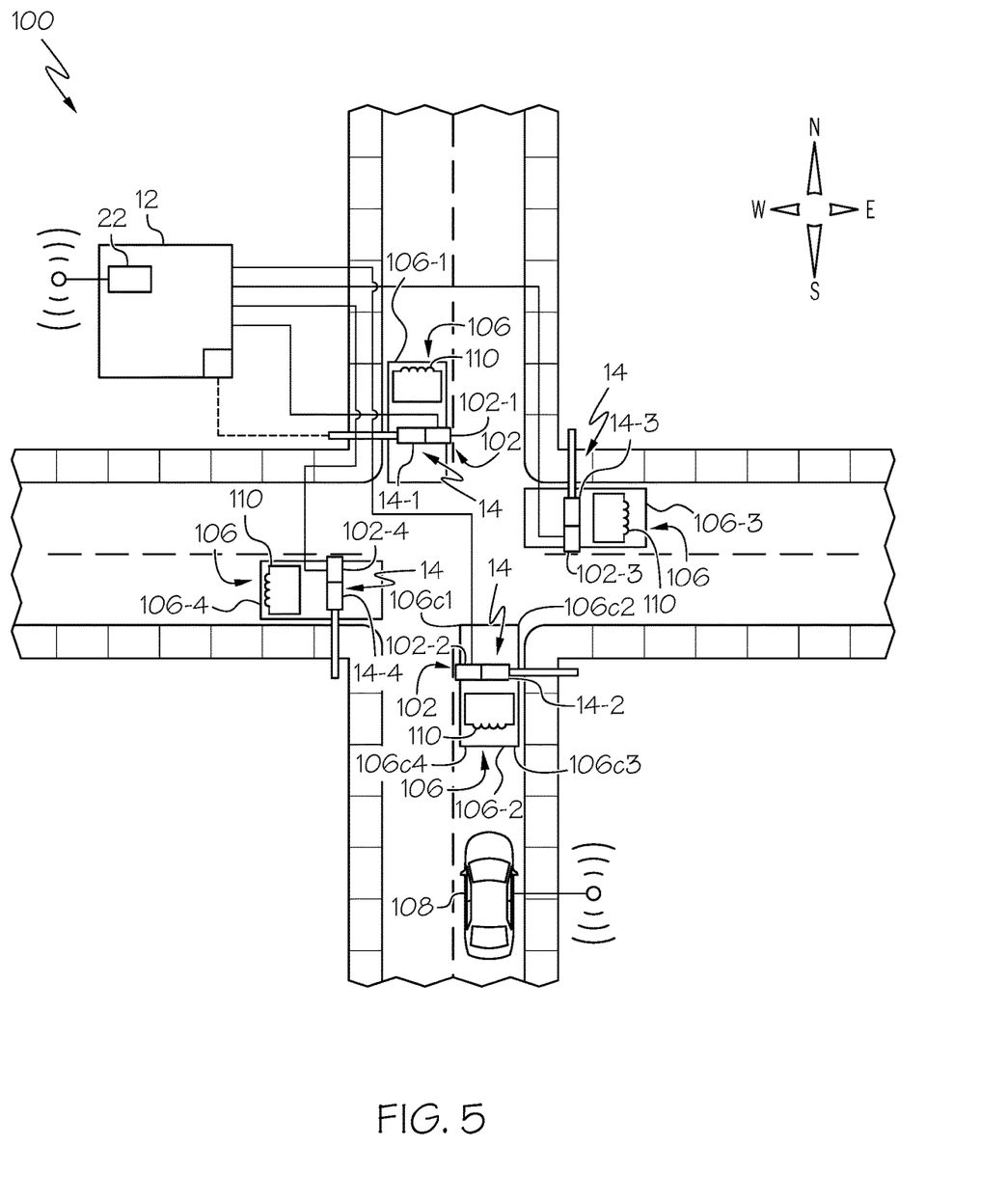
FIG. 5 is a diagram of a roadway intersection that includes a traffic monitoring system in accordance with another embodiment of the present invention.

FIG. 5 is diagram of a roadway intersection 100 that includes a traffic monitoring system 12 in accordance with an embodiment of the present invention. Common elements of roadway intersections 10 and 100 have been described with reference to FIGS. 1 and 2. Roadway intersection 100 further includes one or more image recorders 102 such as, for example, still cameras, video cameras, or a combination of still and video cameras. The cameras are collectively identified by reference character 102, however, to distinguish individual cameras 102, the camera associated with signal head 14-1 is identified by reference character 102-1, the camera associated with signal head 14-2 is identified by reference character 102-2, the camera associated with signal head 14-3 is identified by reference character 102-3, and the camera associated with signal head 14-4 is identified by reference character 102-4. Cameras 102 may be hard wire connected to data aggregator 22 via metallic interconnects, optical fibers, or the like or they may be wirelessly connected to data aggregator 22 via, for example, a radio frequency transmitter.

In addition, each intersection includes a vehicle detection zone 106 from which information regarding the presence or absence of a vehicle 108 can be detected. The vehicle detection zones are collectively identified by reference character 106, however, to vehicle detection zones 106, the vehicle detection zone associated with or adjacent to signal head 14-1 is identified by reference character 106-1, the vehicle detection zone associated with or adjacent to signal head 14-2 is identified by reference character 106-2, the vehicle detection zone associated with or adjacent to signal head 14-3 is identified by reference character 106-3, and the vehicle detection zone associated with or adjacent to signal head 14-4 is identified by reference character 106-4. Each vehicle detection zone 106-1, 106-2, 106-3, and 106-4 has GPS location boundaries at their corners $106_{c1}$, $106_{c2}$, $106_{c3}$, and $106_{c4}$ that cooperate to form a rectangular vehicle detection zone. Vehicle detection zones 106 may have a square shape, a rectangular shape, a circular shape, an elliptical shape, a polygonal shape, or the like. In addition, the vehicle detection zones at an intersection may be different. For example, vehicle detection zone 106-1 may be rectangular, vehicle detection zone 106-2 may be hexagonal, vehicle detection zone 106-3 may be elliptical, and vehicle detection zone 106-4 may be rectangular. Inductive loops 110 are formed in the road and communicate with, for example, data aggregator 22 to indicate the absence or presence of a vehicle 108. By way of example, inductive loops 110 are hard wire connected to data aggregator 22 via, for example, copper wires, aluminum wires, optical fibers, or the like.

Cameras 102-1, 102-2, 102-3, and 102-4 may be mounted to the same support structures to which signal heads 14-1, 14-2, 14-3, and 14-4, respectively, are mounted. The traffic control system housed in intersection cabinet 12 may communicate with cameras 102-1, 102-2, 102-3, and 102-4 via metal cables, via fiber optic cables, via wireless communications, or the like. Cameras 102 may be configured to transmit DSRC signals, vehicle-to-vehicle (V2V) signals, vehicle-to-everything (V2X) signals, cellular vehicle-to-everything (C-V2X) signals, 3G signals, 4G signals, 5G signals, GPS signals, or the like. The number of cameras 102-1, 102-2, 102-3, and 102-4 connected to cabinet 12 is not limited to four. There may be one, two, three, four, or more cameras connected to intersection cabinet 12.

In operation in which cameras 102 are connected to data aggregator 22 through a wireless connection, a camera such as camera 102-2 monitors the intersection in which vehicle detection zone 102-2 is located. Data is wirelessly transmitted to data aggregator 22 from, for example, camera 102-2 indicating whether a vehicle 108 is present or absent from vehicle detection zone 106-2. As discussed above, the wireless signal may be a DSRC signal, a V2V signal, a V2X signal, a C-V2X signal, a 3G signal, a 4G signal, a 5G signal, a GPS signal, or the like. Vehicle 108 also transmits a signal to data aggregator 22 that includes GPS location information. Like the signal received by data aggregator 22 from camera 102-2, the wireless signal received from vehicle 108 may be a DSRC signal, a V2V signal, a V2X signal, a C-V2X signal, a 3G signal, a 4G signal, a 5G signal, a GPS signal, or the like.

Data aggregator 22 compares the wireless signal from camera 102-2 with the wireless signal transmitted from vehicle 108 to generate a comparison signal. If there is a mismatch between the wireless signal received by data aggregator 22 from camera 102-2 and the wireless signal received by data aggregator 22 from vehicle 108, it generates a comparison signal. The comparison signal may serve as a fault indicator signal or an error signal indicating that at least one of the camera 102-2 and the vehicle 108 is transmitting a signal indicating that a vehicle is present in vehicle detection zone 106. The fault indicator signal is transmitted to traffic signal controller 24 to indicate that an error detection or event mismatch has occurred.

Figure 6:
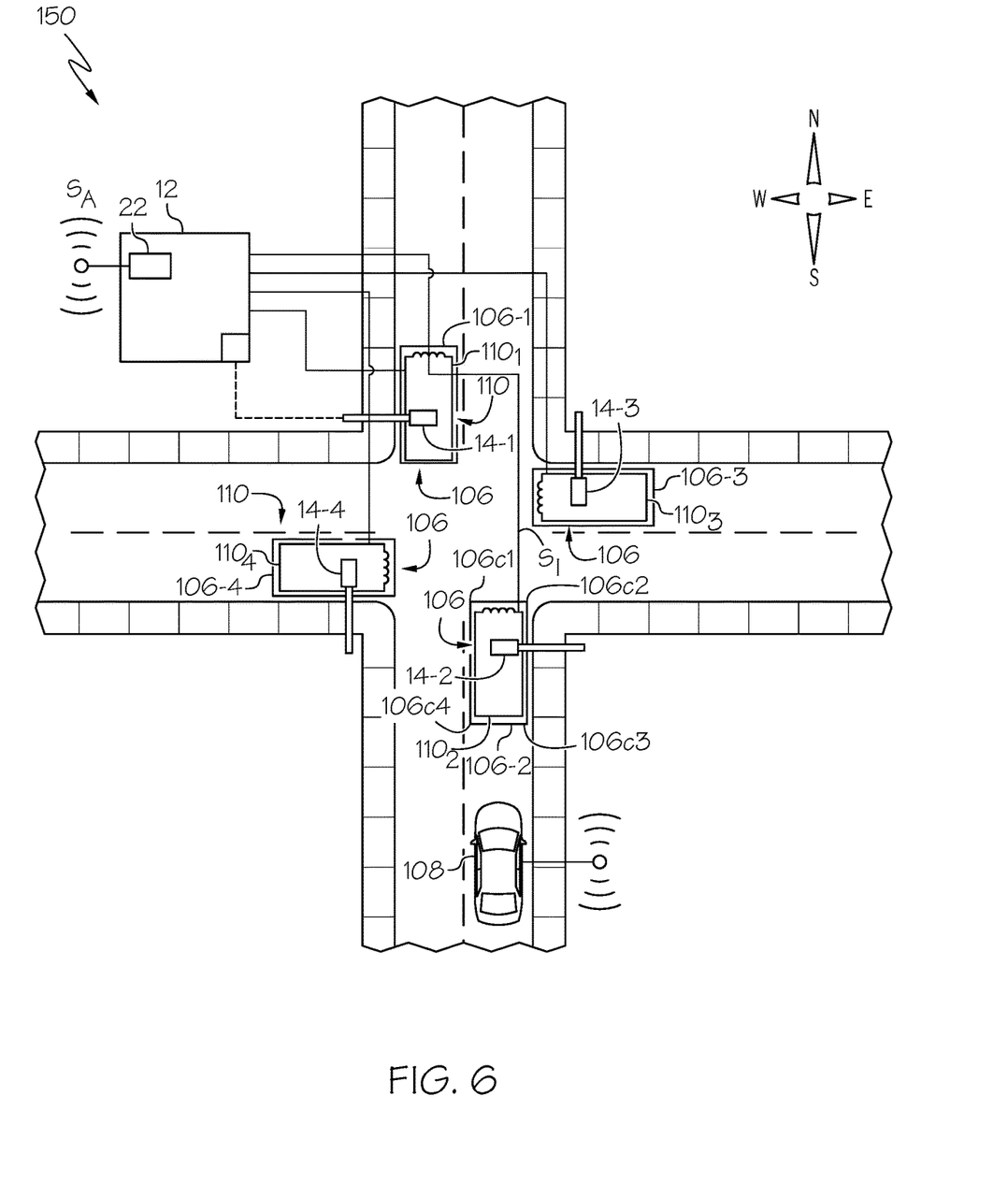
FIG. 6 is a diagram of a roadway intersection that includes a traffic monitoring system in accordance with another embodiment of the present invention.

FIG. 6 is diagram of a roadway intersection 150 that includes a traffic monitoring system 12 in accordance with an embodiment of the present invention. Common elements of roadway intersections 10 and 150 have been described with reference to FIGS. 1 and 2. Roadway intersection 150 further includes one or more vehicle detection devices 110. In accordance with an embodiment, vehicle detection devices 110 may be comprised of an inductive loop which serves as a receiving antenna. In accordance with this embodiment, each lane of roadway intersection 150 includes an inductive loop. However, this is not a limitation and fewer than each lane may include a vehicle detection device 110. To distinguish individual vehicle detection devices 110, a vehicle detection device 110-1 is adjacent or associated with signal head 14-1, a vehicle detection device 110-2 is adjacent or associated with signal head 14-2, a vehicle detection device 110-3 is adjacent or associated with signal head 14-3, and a vehicle detection device 110-4 is adjacent or associated with signal head 14-4. As discussed with reference to FIG. 5, each intersection includes a vehicle detection zone 106-1, 106-2, 106-3, and 106-4 having GPS location boundaries at their corners $106_{c1}$, $106_{c2}$, $106_{c3}$, and $106_{c4}$ that cooperate to form, for example, a rectangular vehicle detection zone. The shape of vehicle detection zones 106 is not a limitation. Vehicle detection zones 106 may have a square shape, a rectangular shape, a circular shape, an elliptical shape, a polygonal shape, or the like. In addition, the vehicle detection zones at an intersection may be different. For example, vehicle detection zone 106-1 may be rectangular, vehicle detection zone 106-2 may be hexagonal, vehicle detection zone 106-3 may be elliptical, and vehicle detection zone 106-4 may be rectangular. Inductive loops 110 are formed in the road and communicate with, for example, data aggregator 22 to indicate the absence or presence of a vehicle 108. By way of example, inductive loops 110 are hard wire connected to data aggregator 22 via, for example, copper wires, aluminum wires, optical fibers, or the like.

In operation, inductive loops 110 are configured as receiving antennas that receive a signal ($S_1$) regarding the presence or absence of a vehicle in a vehicle detection zone 106. The data is transmitted to data aggregator 22 using for example, a hardwire connection. Vehicle 108 also transmits a signal ($S_A$) to data aggregator 22 that includes GPS location information. The wireless signal received from vehicle 108 may be a DSRC signal, a V2V signal, a V2X signal, a C-V2X signal, a 3G signal, a 4G signal, a 5G signal, a GPS signal, or the like.

Data aggregator 22 compares the wireless signal from inductive loop 110 with the wireless signal transmitted from vehicle 108 to generate a comparison signal. If there is a mismatch between the signal received by data aggregator 22 from inductive loop 110 and the wireless signal received by data aggregator 22 from vehicle 108, it generates a comparison signal. The comparison signal may serve as a fault indicator signal or an error signal indicating that at least one of inductive loop 110 and the vehicle 108 is transmitting a signal indicating that a vehicle is present in vehicle detection zone 106. The fault indicator signal is transmitted to traffic signal controller 16 to indicate that an error detection or event mismatch has occurred.

Figure 7:
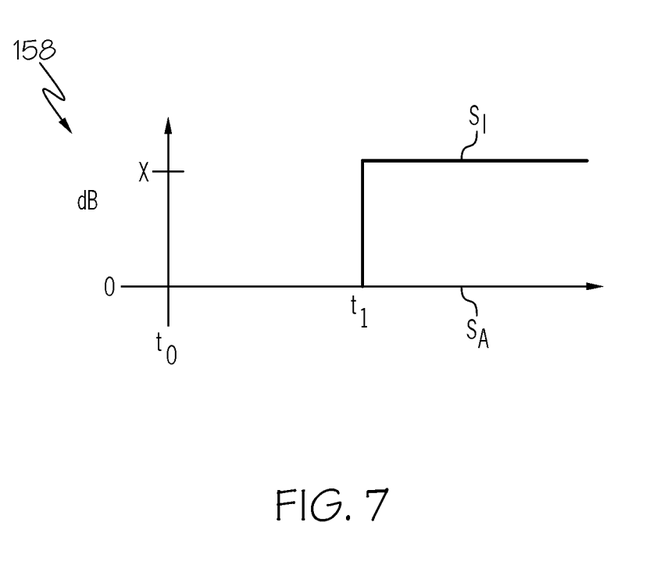
FIG. 7 is a timing diagram of signals of the traffic monitoring system of FIG. 6.

FIG. 7 is a plot 158 illustrating the signal ($S_A$) received by data aggregator 22 and the signal ($S_1$) transmitted by inductive loop 110. In accordance with the example shown in plot 158, from times $t_0$ to $t_1$, the signal strengths of both signals $S_A$ and $S_1$ are at 0 decibels (dB), indicating that data aggregator 22 receives a signal indicating the absence of vehicle 108 from vehicle detection zone 106 and a vehicle 108 is not over inductive loop 110. At time $t_1$, the signal from inductive loop 110 changes to a level x dB that is greater than 0 dB, indicating that a vehicle is over inductive loop 110, where x represents a number. However, the signal received by aggregator 22 indicates that a vehicle 108 is not present over inductive loop 110. Thus, there is a mismatch detected indicating a signal error. Data aggregator 22 compares signal $S_A$ and $S_1$ and generates a comparison signal indicating the mismatch. Data aggregator 22 may use the comparison signal to indicate that an error condition exists or generate an error signal in response to the comparison signal.

By now it should be appreciated that a monitoring system and a method for monitoring traffic that improve the signal integrity of a traffic control system and safety have been provided. The monitoring system includes a data aggregator 22 that can receive many different types of information about the signal cabinet, traffic signal head, traffic conditions, vehicle speeds and directions, etc. and transmit this information to the Cloud for further processing and generation of control signals. The data aggregator includes an antenna and may be coupled to a DSRC source, cellular APN services, or WEB services. In accordance with embodiments of the present invention, information can be communicated to and from controller cabinet 12.

In accordance with an embodiment, a first signal may be received from an over-the-air radio frequency transmission in the allocated DSRC, C-V2X, or 5G frequency ranges used to provide surveillance and control mechanisms to the developing and evolving vehicular transportation section and a second signal may be received from a direct hardwired connection using any number of available physical connectivity and data encoding mechanisms to include Ethernet, fiber, serial, etc. The first received signal is compared to the second received signal to generate a comparison signal, which can be used in determining a variety of performance related characteristics related to signal integrity, signal strength, accuracy of transmitted data or information relative to the second signal that was received from a hardwired source. The resulting comparative and statistical analytics information can then be used to generate a "field check" condition indication ranked according to severity and potential for negative impact on intersection transit safety prioritization.

In accordance with another embodiment, two radio signals are compared, one from a DSRC transmitter and one from a C-V2X transmitter.

In accordance with another embodiment, two radio signals are compared, one from a DSRC transmitter and one from a 5G transmitter.

In accordance with another embodiment, two radio signals are compared, one from a C-V2X transmitter and one from a 5G transmitter.

In accordance with another embodiment, a radio signal is received from an antenna embedded in the pavement, where the antenna is formed from an inductive loop detector. The first received signal is a detector activation signal, that validates the location of the vehicles and the second received signal is a radio signal input from a source that is further away from the traffic signal controller than the distance of the inductive loop from the controller. The second received signal may be a DSRC signal, a C-V2X signal, a 5G signal, or the like, with GPS location information of the vehicle. A third received signal may be a radio signal from the pavement embedded loop, which may be a DSRC signal, a C-V2X signal, or a 5G signal. The third received signal is generated by a degraded performance antenna due to its being embedded in the pavement. Thus, the signal strength of the third received signal is strongest in response to a vehicle being directly above the inductive loop embedded in the pavement. It should be noted that the embedded inductive loop forms a defined GPS boundary for the loop. These three input signals can be used to validate the location of the vehicle transmitting the signal.

In accordance with another embodiment, the inductive loop is replaced by a video detection system. In this embodiment, two input signals may be used for validation, one signal transmitted via one of DSRC, C-V2X, or 5G and the second signal from the video vehicle detection event that occurs in the GPS bounded detection zone. The location of the transmitting vehicles location data can be determined from these two input signals.

In accordance with another embodiment, an antenna is provided for receiving signals from a road side unit that is monitoring for whether a signal is being transmitted from a road side unit.

In accordance with another embodiment, the content of signals being transmitted is monitored to determine whether they are within specifications for radio transmission, e.g., are the signals too weak or too strong.

In accordance with another embodiment, a signal that is wirelessly transmitted is compared to the signal that is transmitted via a hardwire to determine if they match. If they don't match then a mismatch or error signal is generated.

In accordance with another embodiment, antennas that are geographically dispersed may be monitored, which allows determining a time differential at which signals are received; thereby allowing the ability to provide additional operational characteristics.

In accordance with another embodiment, location validation is performed by determining whether a vehicle is present or not.

In accordance with another embodiment, hackers are prevented from spoofing a GPS signal. An advantage of this is that if a signal indicates a car is present at a position in a roadway, but there is no car present, a GPS mismatch occurs. The mismatch can be determined by comparing a hardwired signal from the location and a wireless signal.

In accordance with another embodiment, a signal that is wirelessly transmitted is compared to the signal that is transmitted via a hardwire to determine if they match. If they don't match then a mismatch or error signal is generated. In this embodiment, the hardwired signal may be encrypted, the wireless signal may be encrypted, the hardwired signal and the wireless signal may be encrypted, or neither signal may be encrypted.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for verifying information associated with vehicular traffic, comprising:
    monitoring a wireless signal that includes wireless information associated with the vehicular traffic, wherein the wireless signal is a signal selected from a group of signals comprising a dedicated short range communication (DSRC) channel, a vehicle-to-vehicle (V2V) channel, a vehicle-to-everything (V2E) channel, a cellular vehicle-to-everything (C-V2X) channel, and a 5G frequency range;
    monitoring a non-wireless signal that includes non-wireless information associated with the vehicular traffic; and
    generating a comparison signal in response to comparing the wireless information associated with the vehicular traffic with the non-wireless information associated with the vehicular traffic;
    wherein the wireless signal is transmitted by a roadside unit, and wherein the non-wireless signal is transmitted by the roadside unit.

2. The method of claim 1, further including generating an error signal in response to the comparison signal.

3. The method of claim 1, further including using the comparison signal as an error signal.

4. The method of claim 1, further including storing the wireless information associated with the vehicular traffic.

5. The method of claim 1, further including storing the non-wireless information associated with the vehicular traffic.

6. The method of claim 1, further including storing the comparison signal.

7. The method of claim 1, further including ranking the at least one of the wireless information associated with the vehicular traffic or the non-wireless information associated with the vehicular traffic.

8. The method of claim 1, wherein the wireless signal is at one of 5.8 GigaHertz or 5.9 GHertz.

9. A traffic control system, comprising:
    a traffic monitor having a first input, a second input, and an output;
    a first traffic signal source transmissively coupled to the first input of the traffic monitor;
    a second traffic signal source transmissively coupled to the second input of the traffic monitor; and
    a comparison circuit configured to compare a first signal from the first traffic signal source with a second signal from the second traffic signal source, and further configured to generate an error signal when the first signal and the second signal do not match and transmit such error signal to the traffic monitor such that the output of the traffic monitor directs a flashing signal by a traffic signal head.

10. The traffic control system of claim 9, wherein the first traffic signal source is transmissively coupled to the first input of the traffic monitor through a hardwired electrical interconnect.

11. The traffic control system of claim 10, wherein the second traffic signal source is transmissively coupled to the second input of the traffic monitor through a wireless signal.

12. The traffic control system of claim 9, wherein the first traffic signal source is transmissively coupled to the first input of the traffic monitor through a first wireless signal and the second traffic signal source is transmissively coupled to the second input of the traffic monitor through a second wireless signal.

13. The method of claim 1, wherein the comparison signal is configured to generate an error signal when the wireless signal and the non-wireless signal do not match and the error signal is transmitted to a traffic signal controller for display of a flashing signal by a traffic signal head.

* * * * *